No. 740,855. Patented October 6, 1903.

UNITED STATES PATENT OFFICE.

CARL HERMANN VON HOESSLE, OF RADEBEUL, NEAR DRESDEN, GERMANY, ASSIGNOR TO CHEMISCHE FABRIK VON HEYDEN, ACTIENGESELLSCHAFT, OF RADEBEUL, NEAR DRESDEN, SAXONY, GERMANY.

MERCUROUS CHLORID.

SPECIFICATION forming part of Letters Patent No. 740,855, dated October 6, 1903.

Application filed June 9, 1903. Serial No. 160,742. (Specimens.)

*To all whom it may concern:*

Be it known that I, CARL HERMANN VON HOESSLE, a subject of the King of Saxony, and a resident of Radebeul, near Dresden, in the Kingdom of Saxony, in the German Empire, have invented a new and useful Mercurous Chlorid (Calomel) Soluble in Water, of which the following is a specification.

My invention consists in a new salt of mercury soluble in water which may be used in medicine in cases in which mercury preparations are employed.

In carrying out the manufacture of this new salt I proceed as follows: Five parts of peptone, albumose, albumen, gelatin, or any other body of the class of the albumens are dissolved in one hundred parts of water, to which a solution of one part of sodium chlorid in five parts of water is added, whereupon a solution of three parts of mercurous nitrate, $Hg_2(NO_3)_2$, in one hundred parts of water is added under agitation. If any precipitate is formed, this can be dissolved by the addition of alkali. Now in consequence of the reaction between the mercurous nitrate, $Hg_2(NO_3)_2$, and the sodium chlorid there is in the resulting solution mercurous chlorid, not in the only form of insoluble calomel heretofore known, but in the dissolved colloidal state. The colloidal calomel is isolated in the simplest manner from this solution by acidulating the solution, the colloidal calomel falling down as a precipitate. This precipitate is filtered off, washed, and redissolved in water by addition of a very small quantity of alkali, preferably caustic soda. The colloidal calomel is obtained from this solution in a solid form either by evaporating or by precipitating by means of alcohol and pulverizing. The colloidal calomel thus obtained forms a white or slightly gray colored powder of neutral reaction, is insoluble in alcohol and ether, soluble in water, forming an opalescent aqueous solution. If an acid is added to the aqueous solution, the colloidal calomel precipitates. On neutralizing by addition of an alkali or carbonate of alkali it dissolves again. This process or method of manufacture may be varied in many ways—by the use of other proportions, by the employment of other chlorids of the alkaline or earth-alkaline metals instead of sodium chlorid, by the use of other substances of the albumen group, or by the employment of other splitting-off products and derivates of the albumen bodies.

The process may be simplified as follows: The solution need not be precipitated with acid nor afterward treated as described above, but may be simply subjected to dialysis and then precipitated with alcohol or evaporated to dryness.

What I claim as my invention is—

The product herein described, colloidal calomel, being a dull-white to gray powder, containing mercurous chlorid ($Hg_2Cl_2$) in a water-soluble form, of neutral reaction, insoluble in alcohol and ether, easily soluble in water to an opalescent liquid and capable of being precipitated from the aqueous solution on addition of acids.

In witness whereof I have hereunto set my hand in presence of two witnesses.

CARL HERMANN VON HOESSLE.

Witnesses:
GEORG RICHTER,
GEORG HEUSSINGER.